(12) United States Patent
Bailey et al.

(10) Patent No.: US 10,343,757 B2
(45) Date of Patent: Jul. 9, 2019

(54) METHOD AND SYSTEM FOR CONTROLLING ENGINE PERFORMANCE

(71) Applicant: General Electric Company, Schenectady, NY (US)

(72) Inventors: Kevin Paul Bailey, Grove City, PA (US); John Dowell, Grove City, PA (US); Frederick Thwaites, Erie, PA (US); Jonathan Nagurney, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 224 days.

(21) Appl. No.: 13/863,258

(22) Filed: Apr. 15, 2013

(65) Prior Publication Data

US 2013/0231806 A1 Sep. 5, 2013

Related U.S. Application Data

(62) Division of application No. 12/816,063, filed on Jun. 15, 2010, now abandoned.

(51) Int. Cl.
*B63H 21/21* (2006.01)
*F02B 37/16* (2006.01)

(52) U.S. Cl.
CPC ............. *B63H 21/21* (2013.01); *F02B 37/16* (2013.01); *Y02T 10/144* (2013.01)

(58) Field of Classification Search
CPC ...... B63H 21/21; B63H 21/213; B63H 25/42; B63H 25/04

USPC .......................................................... 701/21
See application file for complete search history.

(56) References Cited

U.S. PATENT DOCUMENTS

| | | | |
|---|---|---|---|
| 2,173,595 A | 9/1939 | Schutte | |
| 3,232,044 A | 2/1966 | Gratzmuller | |
| 4,249,382 A | 2/1981 | Evans et al. | |
| 4,373,336 A * | 2/1983 | Horler | F02B 37/16 60/605.1 |
| 4,378,677 A | 4/1983 | Zumstein | |
| 4,559,784 A | 12/1985 | Jenny et al. | |
| 4,698,761 A | 10/1987 | Cooper et al. | |
| 4,833,886 A | 5/1989 | Meier | |
| 5,561,602 A | 10/1996 | Bessler et al. | |
| 5,724,813 A | 3/1998 | Fenelon et al. | |
| 6,248,041 B1 | 6/2001 | Den Besten | |

(Continued)

FOREIGN PATENT DOCUMENTS

| | | |
|---|---|---|
| DE | 1451901 | 5/1969 |
| EP | 1288463 A1 | 3/2003 |

(Continued)

*Primary Examiner* — Nathan C Uber
*Assistant Examiner* — Fawaad Haider
(74) *Attorney, Agent, or Firm* — McCoy Russell LLP

(57) ABSTRACT

Methods and systems are provided for operating a vehicle including an engine comprising a turbocharger including a compressor and a turbine. The engine further includes a bypass path configured to selectively route gas from downstream of the compressor to upstream of the turbine. In one embodiment, the method comprises selectively increasing gas flow to the engine by adjusting gas flow through the bypass path from downstream of the compressor to upstream of the turbine. In this manner, the performance of the engine may be adjusted for various operating conditions.

20 Claims, 6 Drawing Sheets

(56) References Cited

U.S. PATENT DOCUMENTS

| | | |
|---|---|---|
| 6,295,816 B1 | 10/2001 | Gallagher et al. |
| 6,324,848 B1 | 12/2001 | Gladden et al. |
| 6,422,014 B1 | 7/2002 | Gladden |
| 6,601,388 B1 | 8/2003 | Gladden |
| 6,912,852 B2 | 7/2005 | Gottemoller et al. |
| 6,945,047 B2 | 9/2005 | Shea et al. |
| 6,990,814 B2 | 1/2006 | Boley et al. |
| 7,032,382 B2 | 4/2006 | Onodera et al. |
| 7,047,742 B2 | 5/2006 | Kono et al. |
| 7,322,194 B2 | 1/2008 | Sun et al. |
| 7,451,597 B2 | 11/2008 | Kojima et al. |
| 7,533,657 B2 | 5/2009 | Onodera |
| 8,387,382 B1 * | 3/2013 | Dunn ................ F02B 37/10 60/605.1 |
| 2003/0183212 A1 | 10/2003 | Gottemoller et al. |
| 2004/0250541 A1 | 12/2004 | Gottemoller et al. |
| 2006/0117742 A1 * | 6/2006 | Bellinger et al. ........... 60/288 |
| 2008/0141921 A1 * | 6/2008 | Hinderks ................ 114/274 |
| 2008/0216475 A1 | 9/2008 | Kasper et al. |
| 2009/0211247 A1 | 8/2009 | McEwan et al. |

FOREIGN PATENT DOCUMENTS

| | | |
|---|---|---|
| EP | 1291505 A2 | 3/2003 |
| EP | 1484497 A2 | 12/2004 |
| JP | 56138433 A | 10/1981 |
| JP | 61108822 A | 5/1986 |
| WO | 2006096337 A1 | 9/2006 |
| WO | 2006137279 A1 | 12/2006 |
| WO | 2008050178 A1 | 5/2008 |

* cited by examiner

METHOD AND SYSTEM FOR CONTROLLING ENGINE PERFORMANCE

CROSS REFERENCE TO RELATED APPLICATIONS

This application is a divisional of U.S. patent application Ser. No. 12/816,063 filed Jun. 15, 2010, the disclosure of which is incorporated by reference in its entirety for all purposes.

FIELD

The subject matter disclosed herein relates to a method and system for controlling engine performance in a vehicle, such as a locomotive or a mining truck.

BACKGROUND

An off-highway vehicle, such as a locomotive, a mining truck, or a marine vehicle, may include an engine having a turbocharger that is designed to have greater efficiency at the most frequent engine operating conditions. However, such designs may result in lower efficiency at a less common engine operating condition. For example, a vehicle may have a turbocharger with greater efficiency at peak output power than at lower power output. Specifically, the turbocharger compressor and/or turbine may be shaped to optimize flow at higher speeds and pressure ratios, thereby resulting in improved engine efficiency where the engine operates most.

The inventors herein have recognized that even though such turbocharger designs may optimize performance overall, engine performance may be degraded at some operating regions, such as mid speed and mid load regions.

BRIEF DESCRIPTION OF THE INVENTION

Methods and systems are provided for operating a vehicle including an engine and a turbocharger, the turbocharger including a compressor and a turbine. The engine further includes a bypass path configured to selectively route gas from downstream of the compressor to upstream of the turbine. In one embodiment, the method comprises selectively increasing gas flow to the engine by adjusting gas flow through the bypass path from downstream of the compressor to upstream of the turbine. In this manner, the performance of the engine may be adjusted for various operating conditions.

Thus, the performance of the turbocharger may be increased in less efficient operating regions by selectively bypassing gas from downstream of the compressor to upstream of the turbine. For example, during some engine operating conditions, such as when the engine is generating low power output, increased gas flow may be routed through the bypass path to provide additional energy to the turbine and the turbocharger may operate in a more efficient operating range, increasing the airflow to the engine, and thus the air-fuel ratio and the engine efficiency. During other engine operating conditions, such as when the engine is generating peak power output, the bypass path may be closed.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventor herein has recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
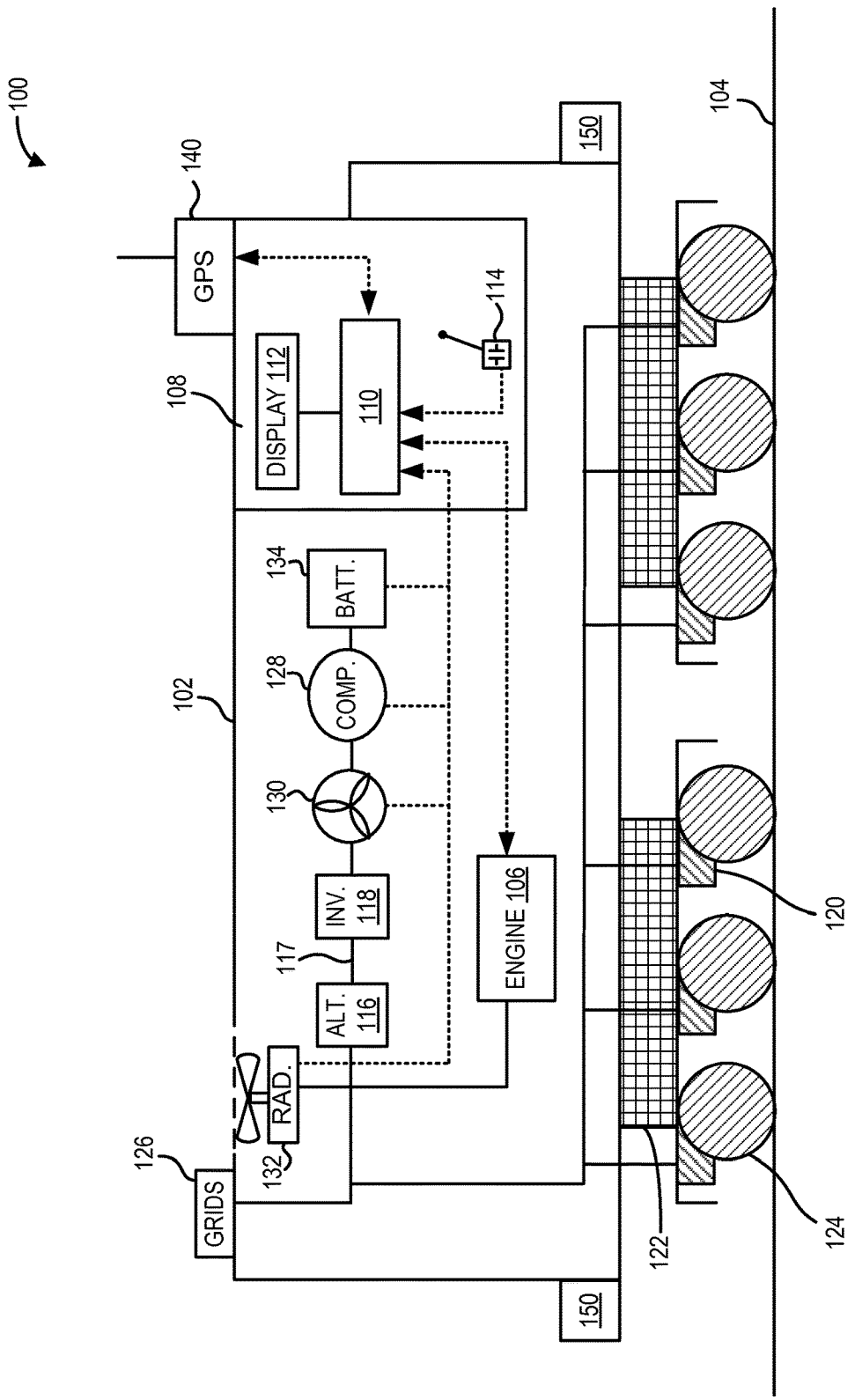
FIG. 1 shows an example embodiment of a diesel-electric locomotive including a turbocharged engine.
Figure 2:
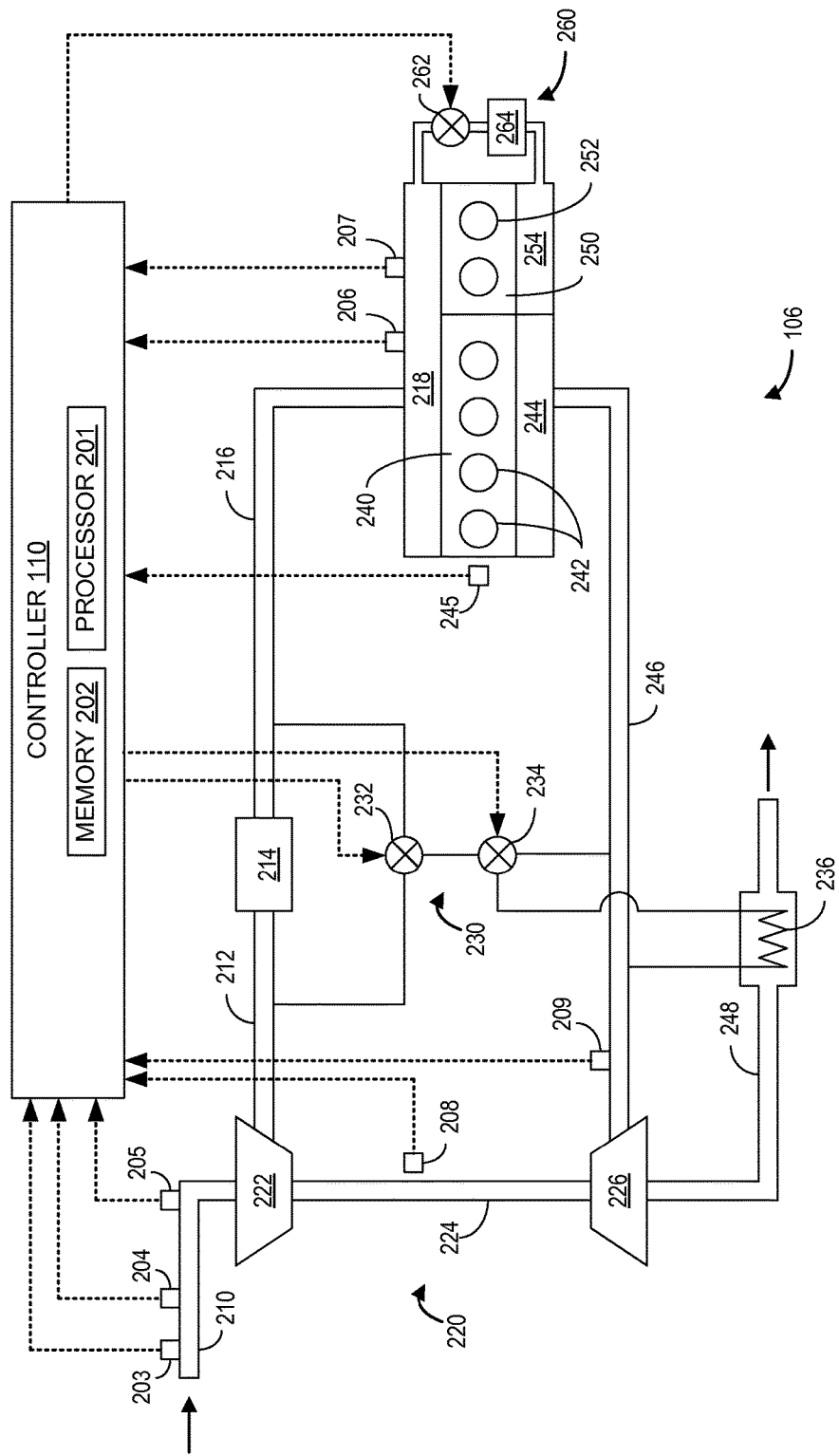
FIG. 2 shows an example embodiment of a turbocharged engine including a compressor, a turbine, and one or more bypass paths for compressed gas to be routed upstream of the turbine.

Vehicles, such as marine vehicles, mining trucks, or the example embodiment of a locomotive in FIG. 1, may include an engine having a turbocharger that is more efficient when the engine is producing peak power output in steady-state. However, it may be desirable to increase the efficiency and/or decrease the emissions of the engine during non-peak power output conditions and during transient conditions. In FIG. 2, an example embodiment of a turbocharged engine includes a compressor, a turbine, and one or more bypass paths for compressed gas to be routed upstream of the turbine. By controlling the bypass paths when the engine is operating at non-peak or transient conditions, the operating point of the turbocharger may be moved from a less efficient operating point (in terms of flow for a given boost pressure) on the turbocharger compressor map to a more efficient operating point on the turbocharger compressor map, as shown by the prophetic data of the turbocharger compressor map of FIG. 3. FIG. 4 shows a high level flow chart of an embodiment of a method of adjusting the bypass paths between the turbocharger compressor outlet and the turbocharger turbine inlet. In addition, there may be distinct engine operating conditions when adjusting bypass paths between the turbocharger compressor outlet and the turbocharger turbine inlet may be tailored to the distinct engine and/or vehicle operating conditions. One such operating condition may be when a vehicle is near or in a tunnel, as shown by the high level flow chart of an embodiment of a method in FIG. 5. In this manner, by adjusting bypass paths between the turbocharger compressor outlet and the turbocharger turbine inlet, the efficiency of the engine may be increased and/or the emissions of the engine may be decreased when the engine is operating at non-peak or transient conditions. A marine vehicle, such as the marine vehicle of FIG. 6, may have additional and/or alternative operational characteristics compared to a locomotive and thus, bypass paths of the engine may be adjusted in a suitable manner for a marine vehicle. FIG. 7 illustrates one example of how bypass paths of an engine of a marine vehicle may be adjusted when accelerating or decelerating the marine vehicle.

FIG. 1 is a block diagram of an example vehicle or vehicle system, herein depicted as locomotive 100, configured to run on track 104. In one example, locomotive 100 may be a diesel electric vehicle operating with a diesel engine 106 located within a main engine housing 102. However, in alternate embodiments, alternate engine configurations may be employed, such as a gasoline, biodiesel, or natural gas engine, for example.

Locomotive operating crew and electronic components involved in locomotive systems control and management, for example controller 110, may be housed within a locomotive cab 108. In one example, controller 110 may include a computer control system. The locomotive control system may further comprise computer readable storage media including code for enabling an on-board monitoring of locomotive operation. Controller 110, overseeing locomotive systems control and management, may be configured to receive signals from a variety of sensors, as further elaborated herein, in order to estimate locomotive operating parameters. For example, controller 110 may estimate geographic coordinates of locomotive 100 using signals from a Global Positioning System (GPS) receiver 140. Controller 110 may be further linked to display 112, such as a diagnostic interface display, providing a user interface to the locomotive operating crew. Controller 110 may control the engine 106, in response to operator input, by sending a command to various engine control hardware components such as inverters 118, alternator 116, relays, fuel injectors, fuel pumps (not shown), etc. For example, the operator may select a power output for the locomotive by operating a throttle control 114. Locomotives may have a finite number of throttle settings, or notches. For example, a locomotive may have an idle position and eight power positions, with notch eight indicating the highest power output and notch 1 indicating the lowest power output above idle. Operating with a discrete number of throttle positions may differ from other vehicles, such as trucks, which may have a variable throttle that may be positioned anywhere in the continuum between idle and full throttle. The operator may provide other inputs to controller 110, such as notification that locomotive 100 is approaching a tunnel or that locomotive 100 is in a tunnel.

Engine 106 may be started with an engine starting system. In one example, a generator start may be performed wherein the electrical energy produced by a generator or alternator 116 may be used to start engine 106. Alternatively, the engine starting system may comprise a motor, such as an electric starter motor, or a compressed air motor, for example. It will also be appreciated that the engine may be started using energy in a battery system, or other appropriate energy sources.

The diesel engine 106 generates a torque that is transmitted to an alternator 116 along a drive shaft (not shown). The generated torque is used by alternator 116 to generate electricity for subsequent propagation of the vehicle. The electrical power may be transmitted along an electrical bus 117 to a variety of downstream electrical components. Based on the nature of the generated electrical output, the electrical bus may be a direct current (DC) bus (as depicted) or an alternating current (AC) bus.

Alternator 116 may be connected in series to one, or more, rectifiers (not shown) that convert the alternator's electrical output to DC electrical power prior to transmission along the DC bus 117. Based on the configuration of a downstream electrical component receiving power from the DC bus, one or more inverters 118 may be configured to invert the electrical power from the electrical bus prior to supplying electrical power to the downstream component. In one embodiment of locomotive 100, a single inverter 118 may supply AC electrical power from a DC electrical bus to a plurality of components. In an alternate embodiment, each of a plurality of distinct inverters may supply electrical power to a distinct component.

A traction motor 120, mounted on a truck 122 below the main engine housing 102, may receive electrical power from alternator 116 through the DC bus 117 to provide traction power to propel the locomotive. As described herein, traction motor 120 may be an AC motor. Accordingly, an inverter paired with the traction motor may convert the DC input to an appropriate AC input, such as a three-phase AC input, for subsequent use by the traction motor. In alternate embodiments, traction motor 120 may be a DC motor directly employing the output of the alternator 116 after rectification and transmission along the DC bus 117. One example locomotive configuration includes one inverter/traction motor pair per wheel-axle 124. As depicted herein, six pairs of inverter/traction motors are shown for each of six pairs of wheel-axle of the locomotive. Traction motor 120 may also be configured to act as a generator providing dynamic braking to brake locomotive 100. In particular, during dynamic braking, the traction motor may provide torque in a direction that is opposite from the rolling direction, thereby generating electricity that is dissipated as heat by a grid of resistors 126 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

Air brakes (not shown) making use of compressed air may be used by locomotive 100 as part of a vehicle braking system. The compressed air may be generated from intake air by compressor 128. A multitude of motor driven airflow devices may be operated for temperature control of locomotive components. The airflow devices may include, but are not limited to, blowers, radiators, and fans. A variety of blowers 130 may be provided for the forced-air cooling of various electrical components. For example, a traction motor blower to cool traction motor 120 during periods of heavy work. Engine temperature is maintained in part by a radiator 132. A cooling system comprising a water-based coolant may optionally be used in conjunction with the radiator 132 to provide additional cooling of the engine.

An on-board electrical energy storage device, represented by battery 134 in this example, may also be linked to DC bus 117. A DC-DC converter (not shown) may be configured between DC bus 117 and battery 134 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running engine 106. The electrical energy stored in the battery may be used during a stand-by mode of engine operation, or when the engine is shut down, to operate various electronic components such as lights, on-board monitoring systems, microprocessors, displays, climate controls, and the like. Battery 134 may also be used to provide an initial charge to start-up engine 106 from a shut-down condition. In alternate embodiments, the electrical energy storage device may be a super-capacitor, for example.

Locomotive 100 may be coupled to a vehicle, such as another locomotive or a railroad car, with a coupling device, such as coupler 150. Locomotive 100 may include one or more couplers to couple with one or more vehicles in a series of vehicles. In one example, a first locomotive may be connected to a second locomotive with coupler 150. A controller in the first locomotive, such as controller 110, may be configured to receive and transmit information to a controller in the second locomotive. The information may include the position or order of a series of locomotives, for example. As non-limiting examples, the information may be transmitted with a wireless network or an electrical cable connecting each locomotive. In this manner, a locomotive may communicate information such as engine and/or vehicle operating conditions to one or more other locomotives.

FIG. 2 illustrates an example embodiment of engine 106 comprising bypass path 230 and a turbocharger 220 including a compressor 222, a turbine 226, and a driveshaft 224 connecting compressor 222 to turbine 226. Compressor 222 receives gas, such as air at atmospheric pressure, through inlet 210 and outputs compressed gas at boost pressure into air passage 212. In an alternative embodiment configured for port fuel injection, gas entering inlet 210 may include atomized liquid fuel or gaseous fuel, such as compressed natural gas (CNG), for example. In yet another alternative embodiment, gas entering inlet 210 may include exhaust gasses, such as when low pressure exhaust gas recirculation is included. In yet another alternative embodiment, gas entering inlet 210 may be compressed gas from an earlier stage compressor in a multi-stage turbocharger. Compressed gas may be cooled by intercooler 214 as the gas travels from passage 212 through intercooler 214 to passage 216. Compressed gas may enter an intake manifold 218 from passage 216. The pressure and temperature of gas in intake manifold 218 may be measured with a pressure sensor 206 and a temperature sensor 207, respectively. Properties of the intake gas may be measured with one or more of a pressure sensor 203, a temperature sensor 204, and a mass airflow sensor 205 to measure the pressure, temperature, and mass airflow, respectively, of the intake gas.

Engine 106 may receive control parameters from a control system including controller 110. Controller 110 may include a processor 201 for executing instructions that are stored in a computer readable storage medium, such as memory 202. The instructions may include routines for controlling bypass path 230, for example. Controller 110 may receive signals from engine sensors such as sensors 203-209 and 245 to determine engine operating conditions. Controller 110 may transmit signals to valves 232, 234, and 262 to control engine 106, for example. Controller 110 may execute code to determine an engine operating mode and the engine operating mode may be stored in the computer readable storage medium.

The example embodiment of engine 106 comprises a first cylinder bank 240 including one or more cylinders 242 and a second cylinder bank 250 including one or more cylinders 252. Each cylinder of engine 106 includes a combustion chamber where gasses may be received from intake manifold 218 and burned with fuel that may be injected with a fuel injector (not shown) controlled by controller 110. Exhaust gasses from each cylinder of the second cylinder bank 250 are received by a second exhaust manifold 254 and may be recirculated to the intake manifold 218 through an exhaust gas recirculation (EGR) system 260. EGR system 260 is depicted as a high pressure EGR system, but in an alternative embodiment, a low pressure EGR system may be used. The example embodiment of EGR system 260 includes valve 262 and intercooler 264 for cooling exhaust gasses before reintroducing them into intake manifold 218. As a non-limiting example, valve 262 may be a flutter valve. In an alternative embodiment, EGR system 260 may include a compressor for compressing exhaust gas to the pressure in intake manifold 218.

In a non-limiting example, sensor 245 may be a hall effect sensor for measuring the speed of engine 106. Exhaust gasses from first cylinder bank 240 are received by a first exhaust manifold 244. Exhaust gasses may flow from first exhaust manifold 244 through passage 246, turbine 226, and passage 248. An emission control device (not shown) may be configured to treat exhaust gasses downstream of passage 248. In an alternative embodiment, a wastegate may be included to route exhaust gasses from passage 246 to passage 248, bypassing turbine 226. In another alternative embodiment, gas flowing from passage 248 may flow through an earlier stage turbine in a multi-stage turbocharger.

In the example embodiment, turbocharger 220 is powered by energy from the gasses flowing from passage 246 through turbine 226 to passage 248. Specifically, the flowing gasses impart rotational energy to blades of turbine 226, turning driveshaft 224 and powering compressor 222. In this manner, the flowing gasses provide energy to compressor 222 to create a pressure differential between inlet 210 and passage 212. Speed sensor 208 may measure the rotational speed of turbocharger 220. In a non-limiting example, speed sensor 208 may be a hall effect sensor.

In the example embodiment of engine 106, turbocharger 220 may be more efficient when engine 106 is producing peak power output in steady-state and gas flow through turbine 226 may be greater than at other operating conditions. However, it may be desirable to increase the efficiency and/or decrease the emissions of the engine during non-peak power output conditions and during transient conditions. For example, turbocharger 220 may operate at low efficiency when mass air flow through the compressor is low, and increasing the mass air flow may increase the efficiency of turbocharger 220. Bypass path 230 may include one or more paths for gas at boost pressure to flow to passage 246 upstream of turbine 226. The additional flow of gas through turbine 226 may increase the speed of driveshaft 224 and enable more gas to flow through compressor 222. The additional flow of gas through compressor 222 may move the operating point of turbocharger 220 to a more efficient point enabling more boost pressure and more gas to flow to engine 106, thus increasing the efficiency of engine 106.

As a non-limiting example, bypass path 230 includes valves 232 and 234 for selectively routing gas from passage 212 (e.g., downstream of the compressor 222 and upstream of the intercooler 214) to passage 246 (e.g., upstream of the turbine 226) and for routing gas from passage 216 (e.g., downstream of the compressor 222 and downstream of the intercooler 214) to passage 246. The gas may be heated before reaching passage 246 with heater 236. In a non-limiting example, heater 236 may include one or more passages routed in thermal contact with exhaust passage 248 so that the heat from exhaust gasses may be used to heat gas in bypass path 230. Valve 232 may comprise one or more variable area valves for routing gas from passage 212 and/or passage 216 to valve 234. In one embodiment, valve 232 may be a three port valve. Controller 110 may adjust valve 232 to control the degree of opening of each port of valve 232. Valve 234 may comprise one or more variable area valves for routing gas from valve 232 to passage 246. In one configuration, gas may be routed through valve 234 to passage 246 through heater 236. In one embodiment, valve 234 may be a three port valve. Controller 110 may adjust valve 234 to control the degree of opening of each port of valve 234. Non-limiting examples of valves 232 and valve 234 include a fixed orifice, a pneumatic wastegate valve, and an electromechanical valve. Each valve may be controlled by a digital, analog, or pulse-width modulated signal, for example.

Gas bypassed from downstream of compressor 222 may be heated or cooled on the way to passage 246 upstream of turbine 226. Heating or cooling may be performed selectively based on engine operating conditions. In one embodiment, bypassed gas from passage 212 in communication with bypass path 230 may be heated by heater 236 on the way to passage 246. The additional thermal energy from the heated gas may provide additional energy to the turbine and increase airflow through turbocharger 220. In another example, cooled gas from intercooler 214 may be routed through bypass path 230 to passage 246. The cooled gas may reduce the temperature of gas flowing through turbine 226 which may be desirable when the turbine is designed to operate below a temperature threshold and the current temperature conditions are at or near the threshold. In yet another example, bypassed gas from passage 212 may be routed through bypass path 230 and a fraction of the gas is heated by heater 236 and the other fraction of the gas routed to passage 246 without heating. In this manner, thermal energy may be added to gas entering turbine 226 while keeping the temperature of the gas below the temperature threshold.

The temperature of gas in passage 246 upstream of turbine 226 may be measured by temperature sensor 209 and transmitted to controller 110. In an alternative embodiment, the temperature of gas in passage 246 may be estimated from other engine operating conditions.

As illustrated in FIG. 2, there are various paths for the bypassed gas to take from downstream of compressor 222 to upstream of turbine 226. Bypass path 230 may be configured in different ways to decrease the cost or complexity of routing or to increase the capabilities of bypass path 230, for example. In one embodiment, bypass path 230 is configured so gas from the outlet of the compressor 222 may be routed from upstream of intercooler 214 to the turbine inlet through a valve. In this configuration of bypass path 230, routing complexity may be decreased compared to other embodiments of bypass path 230. In another embodiment, bypass path 230 may be configured so gas from the outlet of intercooler 214 may be routed from upstream of intake manifold 218 to the turbine inlet through a valve. Bypassed gas may be cooled in this configuration of bypass path 230. In yet another embodiment, bypass path 230 may be configured so gas from the outlet of compressor 222 may be routed from upstream of intercooler 214 to the turbine inlet through a valve and heater 236. Bypassed gas may be heated in this configuration of bypass path 230. In yet another embodiment, bypass path 230 may be configured so gas from intake manifold 218 may be routed to exhaust manifold 244 through a valve. Bypassed gas may be cooled in this configuration of bypass path 230. In yet another embodiment, bypass path 230 may be configured so gas from the outlet of the compressor 222 may be routed from upstream of intercooler 214 to the first port of a three-port valve, gas from the outlet of intercooler 214 may be routed from upstream of intake manifold 218 to a second port of the three-port valve, and a third port of the three-port valve may be routed to turbine inlet. In this configuration of bypass path 230, gas from compressor 222 and cooled gas from intercooler 214 may be blended in the three-port valve to tailor a turbocharger exhaust stream temperature to an aftertreatment device. In yet another embodiment, turbocharger 220 may be the final stage of a multi-stage turbocharger and bypass path 230 may be configured to route gas from downstream of compressor 222 to upstream of a turbine in an earlier stage of the multi-stage turbocharger.

Figure 3:
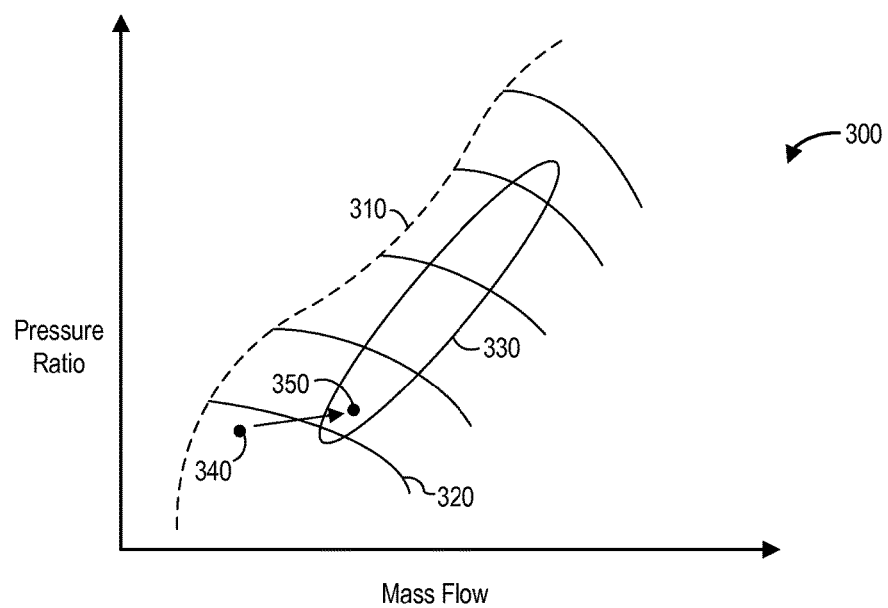
FIG. 3 shows prophetic data of a turbocharger compressor map.
Figure 4:
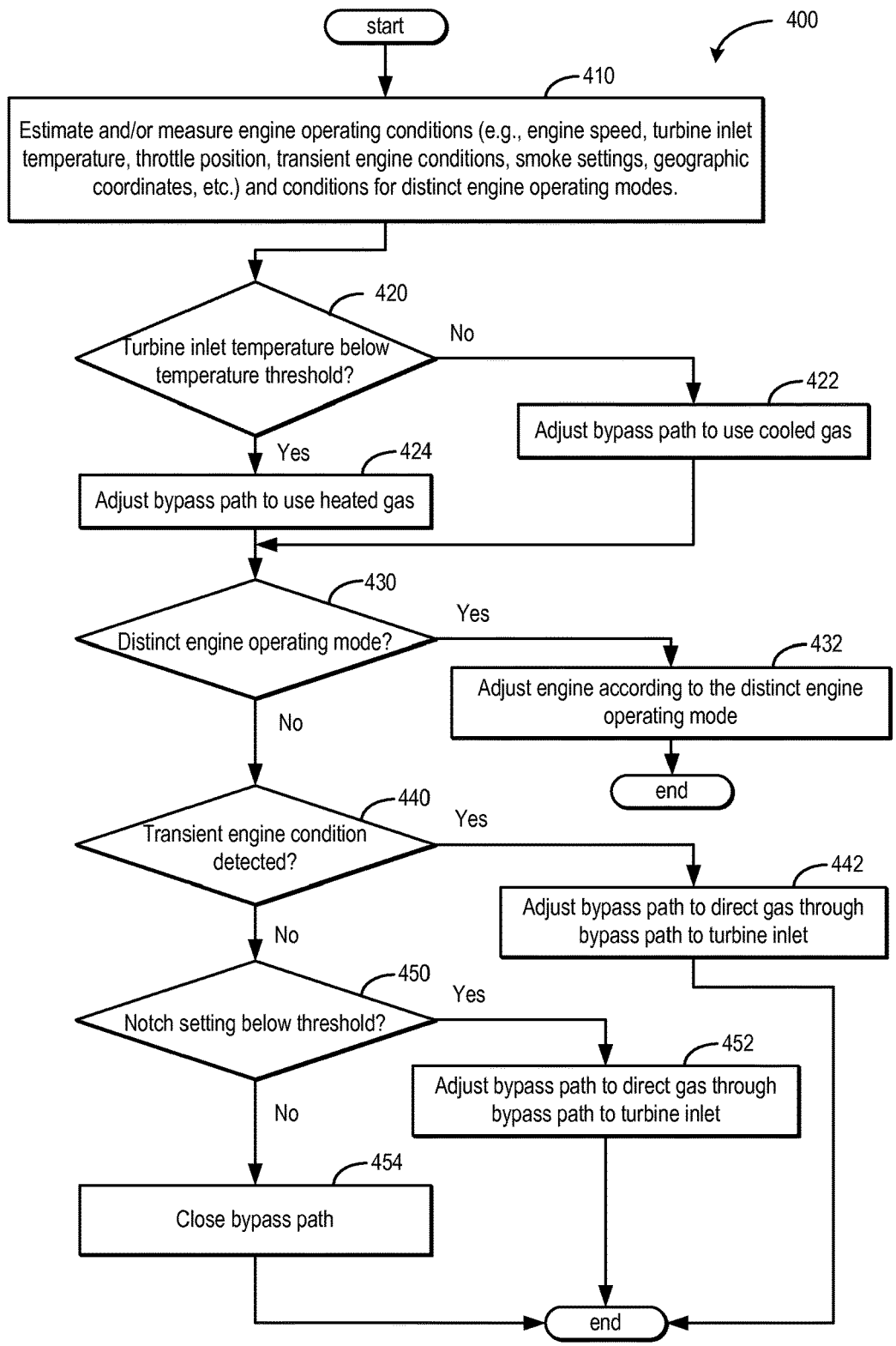
FIG. 4 shows a high level flow chart of an embodiment of a method of adjusting bypass paths between the turbocharger compressor outlet and the turbocharger turbine inlet.

The prophetic data of FIG. 3 illustrates an example of operation of turbocharger 220 and bypass path 230 during non-peak power output operating conditions, when the turbocharger may be less efficient than during peak power output operating conditions. Compressor map 300 includes a vertical axis for a pressure ratio of boost pressure divided by compressor inlet pressure and a horizontal axis for the mass flow of gas through the compressor. Surge line 310 indicates the conditions when compressor 222 is in surge. Surge occurs during low mass flow, when gas flowing through the compressor stalls and may reverse. The reversal of gas flow may cause the engine to lose power. Extending from surge line 310 are lines of constant turbocharger speed, such as turbocharger speedline 320. The turbocharger is more efficient when the operating conditions fall within high efficiency island 330. When the mass flow or the pressure ratio falls outside of high efficiency island 330, the turbocharger will operate less efficiently.

For example, locomotive 100 may be operating with a low notch throttle position and a mass flow of gas through compressor 222 and a pressure ratio of passage 212 pressure divided by inlet 210 pressure correspond to operating condition 340. Turbocharger 220 is less efficient at operating condition 340 than in high efficiency island 330. However, if the speed of turbocharger 220 can be increased to an area of higher turbocharger efficiency, the mass flow of gas through compressor 222 may be increased and the boost pressure may be increased. The speed of turbocharger 220 may be increased by adjusting bypass path 230 so high pressure air is routed upstream of turbine 226. Adjusting bypass path 230 to heat the high pressure air with heater 236 may further increase the speed of turbocharger 220. For example, adjusting bypass path 230 may increase the speed of turbocharger 220 so that the turbocharger operating condition is moved from operating condition 340 to operating condition 350 in high efficiency island 330.

As a result, for the given engine operating condition, increased air charge may be provided to the cylinder at the same power output, thus enabling an increased air-fuel ratio and reduced emissions.

FIG. 4 shows an example embodiment of a method 400 of selectively increasing gas flow to engine 106 by adjusting (e.g., increasing) gas flow through bypass path 230 to increase the speed of turbocharger 220 so that the turbocharger operating condition may be moved from a less efficient operating condition to a more efficient operating condition. Bypass path 230 may also be used in conjunction with other engine components, such as intercooler 214 and heater 236, to control other aspects of engine 106. In one example, bypass path 230 may be used to increase the power output from engine 106 when cooled gas is routed through bypass path 230 and power output from engine 106 is limited by the temperature of gas entering the inlet of turbine 226. In another example, bypass path 230 may be used to increase the efficiency of turbocharger 220 by routing heated gas through bypass path 230 to upstream of turbine 226. In yet another example, bypass path 230 may be used to adjust engine 106 for distinct engine operating conditions, such as approaching or entering a geographic feature, such as a tunnel. Code for executing routine 400 may be encoded as instructions stored on a computer readable storage medium, such as memory 202, and executed by processor 201 of controller 110.

Continuing with routine 400, at 410, the operating conditions of the vehicle and engine 106 may be estimated and/or measured. For example, engine speed and turbine inlet temperature may be measured with sensors 245 and 209, respectively. The position of throttle control 114 may be determined. Transient engine conditions may be detected, such as a change in throttle position or a change in load, such as when accelerating or climbing a hill. Smoke emissions may be measured with a sensor or estimated based on engine operating conditions. Geographic coordinates of the vehicle may be estimated or calculated. For example, a GPS signal from GPS receiver 140 may be used to calculate the geographic coordinates of the vehicle. Geographic features in the path of the vehicle, such as locomotive 100, may be signaled by an operator or calculated. For example, geographic coordinates of a set of predefined geographic features may be stored in a table. A distance between the vehicle and the set of predefined geographic features may be calculated so that the nearest geographic feature and its distance may be determined. Non-limiting examples of geographic features that may be stored in the set of predefined geographic features include a tunnel entrance, a steep grade, and a city boundary.

Distinct engine operating modes may be set based on operator input or the operating conditions of engine 106. In one example, a tunnel operating mode may be set when an approaching tunnel is detected, or when the vehicle is within the tunnel. In another example, a boost limiting mode may be set when gas entering inlet 210 is below a threshold temperature and above a threshold pressure, such as when the vehicle is operating at low altitude on a cold day. In yet another example, a hotel power mode may be set when passenger locomotive is parked at a station. In yet another example, an emission control mode may be set when emissions of engine 106 are to be reduced. In yet another example, a hill climbing mode may be set when an approaching steep grade is detected. From 410, the routine continues at 420.

At 420, the turbine inlet temperature measured or estimated at 410 is compared to a temperature threshold. The temperature threshold is set at a highest desirable temperature of gas entering turbine 226. For example, the temperature threshold may be set to prevent damage of turbine 226 due to overheating. The temperature threshold may be a constant value or the temperature threshold may change during operation of engine 106. For example, the temperature threshold may be reduced if turbine inlet temperatures have been close to the temperature threshold for extended periods of time. Likewise, the temperature threshold may be raised if the turbine inlet pressures have been below the temperature threshold for extended periods of time. If the turbine inlet temperature is greater than the temperature threshold, the routine proceeds to 422. If the turbine inlet temperature is less than or equal to the temperature threshold, the routine proceeds to 424.

At 422, bypass path 230 may be adjusted to use cool air from passage 216 and to bypass heater 236. For example, a first port of valve 232 in communication with passage 212 may be closed, a second port of valve 232 in communication with passage 216 may be opened, and a first port of valve 234 in communication with heater 236 may be closed. In an alternative embodiment, bypass path 230 may be adjusted to use air from passage 212 and to bypass heater 236. In another alternative embodiment, bypass path 230 may be adjusted to use a first fraction of air from passage 212 and a second fraction of air from passage 216 so that the temperature of air flowing through bypass path 230 may be controlled to a temperature between the temperatures in passages 212 and 216. From 422, the routine proceeds to 430.

At 424, bypass path 230 may be adjusted to use heated air from passage 212 and to use heater 236. For example, a first port of valve 232 in communication with passage 212 may be opened, a second port of valve 232 in communication with passage 216 may be closed, and a first port of valve 234 in communication with heater 236 may be opened. From 422, the routine proceeds to 430.

At 430, the routine may determine if one or more distinct engine operating modes are detected. Non-limiting examples of distinct engine operating modes include tunnel operating mode, hill climbing mode, boost limiting mode, hotel power mode, and emission control mode. In the example embodiment, when more than one distinct engine operating mode is detected, a priority encoder or other selection algorithm may be used to give priority to a distinct engine operating mode. If a distinct engine operating mode is detected, the routine continues at 432, otherwise, the routine continues at 440.

At 432, engine 106 may be adjusted according to the distinct engine operating mode detected at 430. In one example, when tunnel operating mode is detected, engine 106 may be adjusted in preparation for entering a tunnel or for operation in a tunnel. In another example, when boost limiting mode is detected, bypass path 230 may be completely or partially opened during high throttle settings to reduce boost pressure in intake manifold 218. Each distinct engine operating mode may adjust engine 106 to increase desirable outputs and/or decrease undesirable outputs of engine 106. The routine exits after 432.

At 440, it is determined if a transient engine condition is detected. During a transient engine condition, turbocharger 220 may be operating outside of high efficiency island 330. Non-limiting transient engine conditions may include an acceleration of the engine or the vehicle, changing a throttle setting, and changing emissions requirements. If a transient engine condition is detected, the routine proceeds to 442, otherwise, the routine proceeds to 450.

At 442, bypass path 230 is adjusted to provide a path for gas to flow from upstream of intake manifold 218 through bypass path 230 to upstream of turbine 226. In one example, gas may flow from passage 212 through heater 236 to passage 246 if bypass path 230 was adjusted to use heated gas at 424. In another example, gas may flow from passage 216 to passage 246 if bypass path 230 was adjusted to use cooled gas at 422. Furthermore, bypass path 230 may be adjusted according to the magnitude of the transient engine condition. In one example, bypass path 230 may be fully opened if the transient engine condition exceeds a threshold. In another example, bypass path 230 may be partially opened (e.g., the degree of opening may be proportional to the magnitude of the transient engine condition) if the transient engine condition is below a threshold. The routine proceeds to 450 from 442.

At 450, the notch setting is compared to a speed threshold. The speed threshold may be determined as those notch settings for which turbocharger 220 is operating outside of high efficiency island 330. For the example embodiment of locomotive 100, the lower notch settings of throttle control 114 may cause turbocharger 220 to operate outside of high efficiency island 330. As a non-limiting example, the lower notch settings may include notches below six and a speed threshold may be set at six. If the notch setting is less than the speed threshold, turbocharger 220 may be operating inefficiently and the routine proceeds to 452. If the notch setting is greater than or equal to the speed threshold, turbocharger 220 may be operating efficiently and the routine proceeds to 454.

At 452, bypass path 230 is adjusted to provide a path for gas to flow from upstream of intake manifold 218 through bypass path 230 to upstream of turbine 226. The gas from upstream of intake manifold 218 may be heated or cooled as determined at 420, 422, and 424. Furthermore, bypass path 230 may be adjusted according to a difference between the notch setting and the speed threshold. For example, the lower throttle settings may receive a greater benefit when more gas is allowed to flow through bypass path 230. Thus, the degree of opening of bypass path 230 may be proportional to the difference between the notch setting and the threshold. The routine exits after 452.

At 454, bypass path 230 is closed so that gas cannot flow from upstream of intake manifold 218 to upstream of turbine 226. For example, valves 232 and 234 may be closed to stop the flow of gas through bypass path 230. The routine exits after 454.

In this manner, routine 400 has the technical effect of adjusting bypass path 230 to selectively route gas from downstream of compressor 222 to upstream of turbine 226. By adjusting bypass path 230 during appropriate engine operating conditions, as elaborated in FIG. 4, the operating point of turbocharger 220 may be moved from a less efficient operating point to a more efficient operating point, as elaborated in the prophetic data in FIG. 3, and gas flow to engine 106 may be increased.

Figure 5:
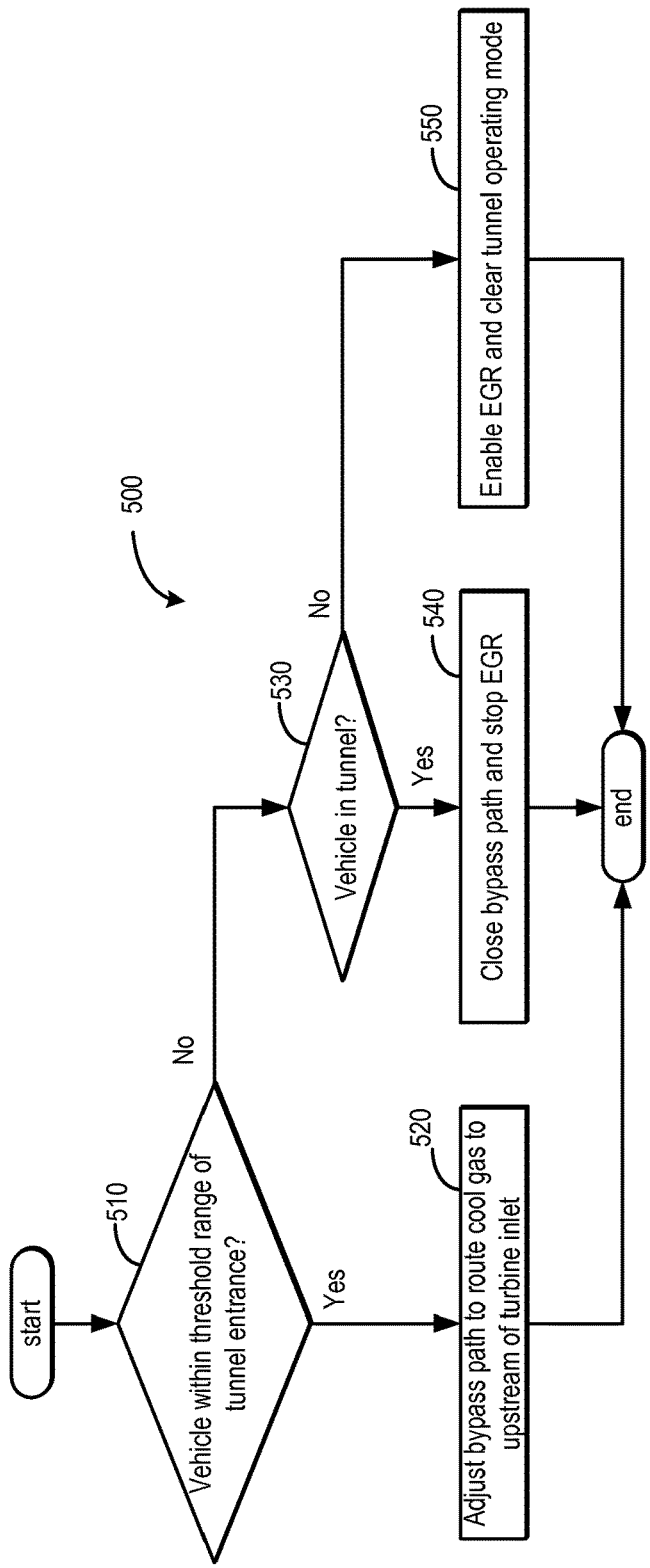
FIG. 5 shows a high level flow chart of an embodiment of a method of adjusting bypass paths between the turbocharger compressor outlet and the turbocharger turbine inlet for an example operating condition, such as when a vehicle is near or in a tunnel.

FIG. 5 illustrates a high level flow chart of an embodiment of a method of operating an engine in a vehicle, when the vehicle is within range of a geographic feature, such as when the vehicle is near or in a tunnel. A tunnel may alter the engine operating conditions of engine 106 and so adjustments to engine 106 prior to and while in the tunnel may be desirable. For example, exhaust from engine 106 or from another engine in the tunnel may be inhaled at inlet 210 which may increase the temperature and lower the oxygen content of gas entering inlet 210. The lower oxygen content of inlet gas may reduce the power output from engine 106 and the higher temperature of inlet gas may propagate to turbine 226 causing further reduction in power output from engine 106 so turbine 226 does not overheat. Ingesting exhaust gasses may be more pronounced when locomotives are coupled in series including a lead locomotive upstream of one or more downstream locomotives. For example, a downstream locomotive may ingest exhaust gasses from each locomotive upstream of the downstream locomotive. The downstream locomotives may ingest additional exhaust gasses in a tunnel and/or outside of a tunnel. The embodiment of the method in FIG. 5 may be implemented as routine 500, which may be called as a subroutine, such as from 432, for example. Code for routine 500 may be encoded as instructions stored on a computer readable storage medium, such as memory 202, and the instructions may be executed by processor 201 of controller 110.

Routine 500 begins at 510, where it is determined if the vehicle is within a threshold range of a geographic feature, such as a tunnel entrance. The threshold range may be a predetermined range or the threshold range may be calculated. In one example, the threshold range is predetermined and stored in a look-up table. The predetermined threshold range may be a constant for all geographic features, or the predetermined threshold range may differ for each known geographic feature. For example, the threshold range may be 100 meters when approaching a short tunnel with a flat grade, but the threshold range may be 2 kilometers when approaching a long tunnel with a steep grade. In another example, the threshold range may be calculated based on engine operating conditions and/or on characteristics of an approaching geographic feature. For example, the speed of the vehicle, the throttle setting, the position of a vehicle in a series of vehicles, and the length of a tunnel may be used to calculate the threshold range. In one example, a downstream locomotive may have a threshold range that is greater a threshold range of an upstream locomotive. If the vehicle is within a threshold range of a tunnel entrance, the routine proceeds to 520, otherwise, the routine proceeds to 530.

At 520, bypass path 230 is adjusted to route cool gas upstream of turbine 226 when the vehicle is approaching a tunnel entrance. For example, a first port of valve 232 in communication with passage 212 may be closed, a second port of valve 232 in communication with passage 216 may be opened, a first port of valve 234 in communication with heater 236 may be closed, and a second port of valve 234 in communication with passage 246 may be opened. In this manner, cool gas may flow from downstream of intercooler 214 to upstream of turbine 226 which may cool turbine 226. The bypassed gas may also lower the oxygen reaching cylinder banks 240 and 250 as the vehicle approaches the tunnel so that oxygen levels are similar before and in the tunnel. Gas flow through bypass path 230 may be adjusted according to engine and/or vehicle operating conditions. For example, a downstream locomotive may adjust bypass path 230 to flow more gas than an upstream locomotive, during operating in or near the tunnel. The routine exits after 520.

At 530, it is determined if the vehicle is in a tunnel. The determination may be made by an operator signaling the condition, by an electronic signal in the tunnel, by calculating the position of the vehicle from GPS signals, or by determining if a tunnel override flag is set, for example. In one example, a vehicle, such as a downstream locomotive, may set a tunnel override flag so the vehicle operates as if the vehicle is in a tunnel. If the vehicle is in a tunnel, the routine proceeds to 540, otherwise the routine proceeds to 550.

At 540, the vehicle is in a tunnel and bypass path 230 is closed and EGR system 260 is stopped. When operating in a tunnel, the gas entering inlet 210 may include exhaust gasses from engine 106 or other engines operating in the tunnel. The exhaust gasses entering inlet 210 could cause engine 106 to behave as if it is connected to a low pressure EGR system in addition to EGR system 260 and the concentration of exhaust gasses in intake manifold 218 could exceed the desired concentration of exhaust gasses. Thus, by stopping or decreasing gas flow from EGR system 260, the exhaust concentration may be maintained at a more desirable level. In an alternative embodiment, the concentration of exhaust gasses may be measured in intake manifold 218, and EGR system 260 may be partially or completely stopped depending on the concentration of exhaust gasses in intake manifold 218. EGR system 260 may be stopped by stopping the flow of fuel to the cylinders of cylinder bank 250. By closing bypass path 230, all available oxygen from the gas entering inlet 210 may be delivered to intake manifold 218 for combustion by the cylinders of cylinder bank 240. The routine exits after 540.

At 550, the vehicle is no longer in the tunnel and tunnel operating mode may be stopped and EGR system 260 may be enabled. When the vehicle exits the tunnel, exhaust gasses and oxygen entering inlet 210 may return to concentrations similar to the concentrations before entering the tunnel and the flow of gas from EGR system 260 may be increased. Thus, bypass path 230 may be adjusted according to other aspects of routine 400. The routine exits after 550.

In this manner, routine 500 has the technical effect of operating an engine in a vehicle, when the vehicle is within range of a geographic feature, such as when the vehicle is near or in a tunnel. By adjusting bypass path 230 and EGR system 260 during tunnel operating mode, as elaborated in FIG. 5, engine power output may be increased when the vehicle is in the tunnel, for example. Increasing the flow of cool gas flow from downstream of compressor 222 to upstream of turbine 226 before a tunnel may cool turbine 226 prior to ingesting hot exhaust gasses in the tunnel. Thus, the turbine inlet temperature may stay below the turbine inlet temperature threshold longer than if the turbine was not cooled. While in the tunnel, decreasing the flow of gas from EGR system 260 may increase the oxygen content flowing to engine 106 and may increase engine power output of the vehicle.

Figure 6:
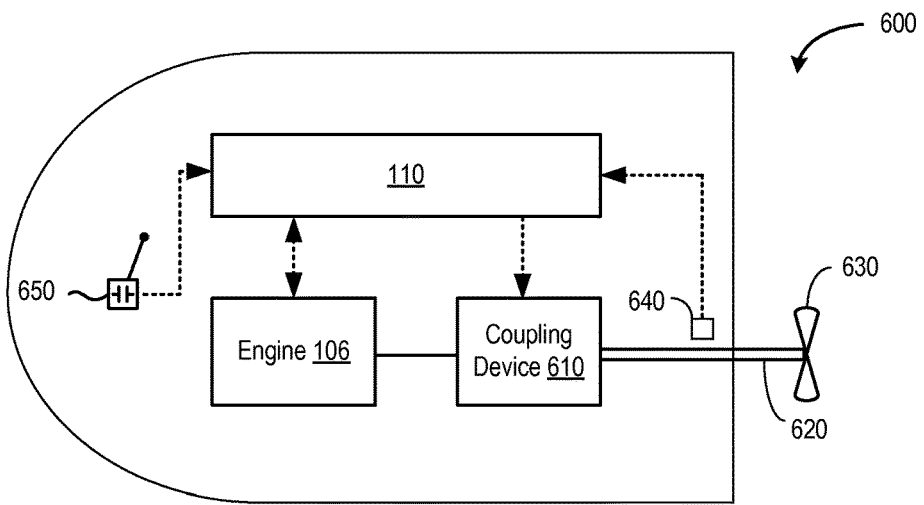
FIG. 6 shows an example embodiment of a diesel-electric marine vehicle including a turbocharged engine.
Figure 7:
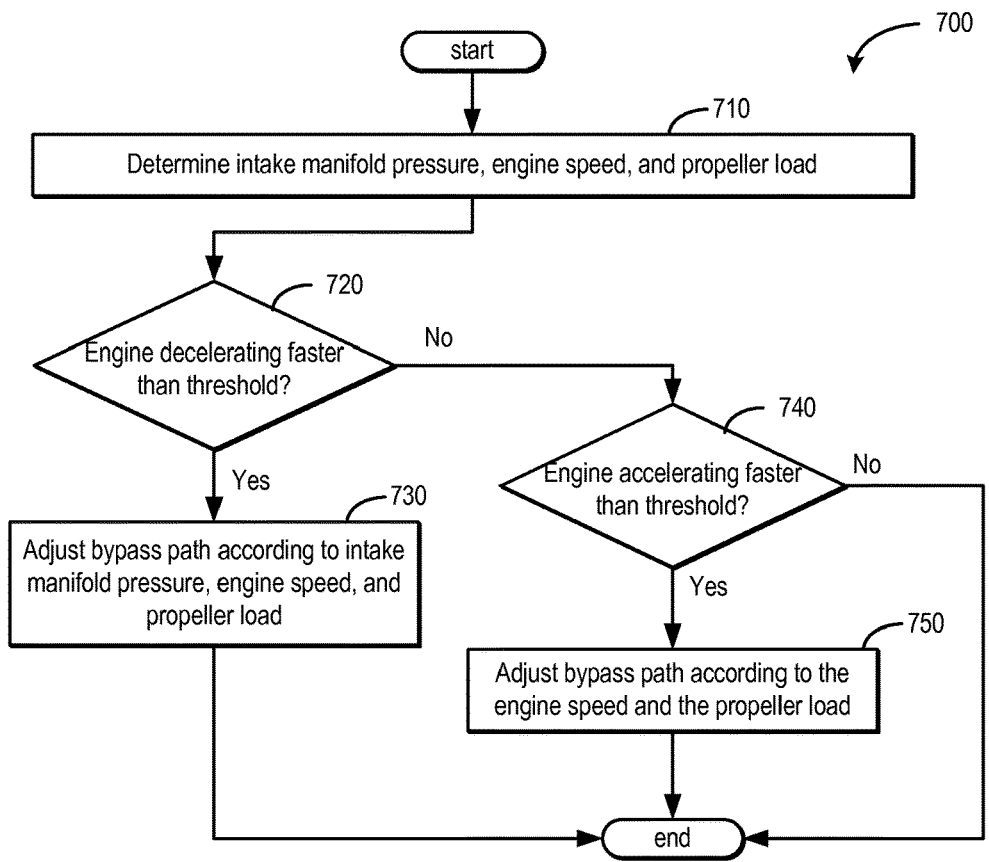
FIG. 7 shows a high-level flow chart of an embodiment of a method of adjusting bypass paths between the turbocharger compressor outlet and the turbocharger turbine inlet for a marine vehicle.

The engine illustrated in FIG. 2 may also be used in other off-highway vehicles, such as the example embodiment of a marine vehicle in FIG. 6. As depicted herein, marine vehicle 600 may include a diesel propulsion system for driving a propeller. In one embodiment, engine 106 may generate torque to drive a propeller 630. Specifically, engine 106 may be connected to a coupling device 610 which may configured to selectively engage or disengage with a propeller shaft 620 connected to propeller 630. In one embodiment, coupling device 610 may include a clutch. In another embodiment, coupling device 610 may include a clutch and a gear box to enable torque modulation. In one embodiment, the rotational speed of propeller shaft 620 may be measured by a speed sensor 640, such as a hall effect sensor. Controller 110 may communicate with engine 106 to control components of engine 106 and to collect sensor data. Controller 110 may control coupling device 610 and receive propeller speed data from speed sensor 640. In the depicted example, propeller 630 is a fixed pitch propeller (FPP). In an alternate embodiment, propeller 630 may be a controllable pitch propeller (CPP). Thus, a propeller load being driven by the torque of engine 106 may depend on the characteristics of coupling device 610, the pitch of propeller 630, and the speed of propeller 630.

During operation, engine 106 of marine vehicle 600 may go through various accelerations and decelerations. For example, the operator may adjust a power output for marine vehicle 600 by operating a throttle control 650. In one example, it may be desirable to increase acceleration of marine vehicle 600 by adjusting bypass path 230 of engine 106. In another example, it may be desirable to reduce or eliminate turbocharger surge during deceleration of engine 106. For example, pressure of the outlet of compressor 222 may not decrease at the same rate as engine rpm and mass air flow during deceleration. Thus, the operating point of turbocharger 220 may move closer to surge line 310 than may be desirable. FIG. 7 illustrates a method 700 for operating engine 106 when engine 106 is included on a marine vehicle.

At 710, the intake manifold pressure, the engine speed, and propeller load may be determined. The pressure of gas in intake manifold 218 may be measured with pressure sensor 206. The engine speed may be measured with speed sensor 245. In one example, the propeller load may be negligible when propeller shaft 620 is disengaged by coupling device 610. In another example, the propeller load may be a function of the pitch of propeller 630 and the speed of propeller 630 when propeller shaft 620 is engaged by coupling device 610. From 710, the routine continues at 720.

At 720, it is determined if engine 106 is decelerating at a rate faster than a threshold. In one embodiment, the engine speed may be measured and recorded at periodic intervals. A current engine speed may be compared to an engine speed recorded at an earlier time. If the current engine speed is less than the earlier engine speed, then engine 106 may be decelerating. In an alternate embodiment, the output of throttle control 650 may be measured and recorded at periodic intervals. A current throttle output may be compared to a throttle output recorded at an earlier time. If the current throttle output is less than the earlier throttle output, then engine 106 may be decelerating. In one example, the threshold may be zero and any deceleration may cause the routine to continue at 730. In another example, the threshold may be greater than zero and small decelerations less than the threshold may be handled as if no deceleration occurred. If the deceleration is less than the threshold, the routine may continue 740, otherwise the routine may continue at 730. In one embodiment, the threshold may vary over the operating range of engine 106. For example, some engine speeds may be more prone to surge and so the threshold for deceleration may be lower at these engine speeds.

At 730, it is determined that engine 106 is decelerating. Thus, bypass path 230 may be adjusted according to pressure of intake manifold 218, engine speed, and propeller load. For example, bypass path 230 may be opened to decrease the pressure of intake manifold 218 by routing gas from downstream of compressor 222 to upstream of turbine 226 via bypass path 230. The degree of opening may be determined according to pressure of intake manifold 218, engine speed, and propeller load. In one embodiment, a predetermined look-up table may map the manifold pressure, engine speed, and propeller load variables to a degree of opening for bypass path 230. The look-up table may be generated from a compressor map, such as compressor map 300 of turbocharger 220, for example. In one embodiment, calculating the propeller load may be simplified by determining whether propeller 630 is engaged or not engaged. For example, bypass path 230 may be adjusted according to one look-up table when propeller 630 is engaged and bypass path 230 may be adjusted according to a different look-up table when propeller 630 is not engaged. Thus, each look-up table may be indexed according to the manifold pressure and engine speed. In an alternative embodiment, bypass path 230 may be adjusted when propeller 630 is engaged and bypass path 230 may not be adjusted when propeller 630 is disengaged. The routine may end after 730.

At 740, it is determined if engine 106 is accelerating at a rate faster than a threshold. Similar to calculating deceleration, a series of engine speed or throttle output measurements may be used to calculate acceleration. If the engine speed is increasing, then engine 106 may be accelerating. In one example, the threshold may be zero and any acceleration may cause the routine to continue at 750. Alternatively, small accelerations may be filtered by selecting a non-zero threshold for acceleration. If acceleration is less than the threshold, then the routine may end. In one embodiment, the threshold may vary over the operating range of engine 106. For example, some engine speeds may operate in less efficient areas of compressor map 300 and so the threshold for acceleration may be lower at these engine speeds.

At 750, it is determined that engine 106 is accelerating. Thus, bypass path 230 may be adjusted according to engine speed and propeller load. For example, bypass path 230 may be opened to increase gas flow through compressor 222 and to move the turbocharger operating point to a more efficient operating point on compressor map 300. Opening bypass path 230 may route gas from downstream of compressor 222 to upstream of turbine 226. In one embodiment, all or a portion of the gas flowing through bypass path 230 may be heated by heater 236 as it is routed upstream of turbine 226. The degree of opening and/or heating may be determined according to engine speed and propeller load. In one embodiment, a predetermined look-up table may map the engine speed and propeller load variables to a degree of opening for bypass path 230. In one embodiment, calculating the propeller load may be simplified by determining whether propeller 630 is engaged or not engaged. For example, bypass path 230 may be adjusted according to one look-up table when propeller 630 is engaged and bypass path 230 may be adjusted according to a different look-up table when propeller 630 is not engaged. In an alternative embodiment, bypass path 230 may be adjusted when propeller 630 is engaged and bypass path 230 may not be adjusted when propeller 630 is disengaged. The routine may end after 750.

Certain embodiments of the invention include a bypass path 230 configured to selectively route gas (e.g., air) from downstream of a compressor 222 to upstream of a turbine 226 (the compressor and turbine being part of a turbocharger 220). In an embodiment, the gas that is routed through the bypass path 230 is shunted around (i.e., bypasses) a combustion portion of the engine 106 where gas is combined with fuel and combusted for driving a mechanical output shaft of the engine or otherwise, e.g., such combustion portion typically including an engine block, cylinder banks 240 and/or 250, cylinders 242, 252, and equipment (such as fuel injectors) for introducing fuel into the cylinders in a controlled manner. Thus, in an embodiment, gas routed through the bypass path 230 is not involved in a fuel/gas combustion event in the engine 106. In another embodiment, at least part of the bypass path 230 is a direct path between downstream of the compressor 222 and upstream of the turbine 226, meaning a direct fluid connection between the compressor downstream and turbine upstream but for any bypass path flow control devices (e.g., valves 232, 234), and without any engine or other components that modify or affect the gas (e.g., intercooler 214, heater 236) other than, again, bypass path flow control devices (e.g., valves 232, 234) and related plumbing. Unless otherwise specified, such as in the claims, this does not preclude the possibility of another part of the bypass path not being a direct path.

In another embodiment, the bypass path 230 is solely a direct path between downstream of the compressor 222 and upstream of the turbine 226, meaning (i) the bypass path comprises a direct fluid connection between the compressor downstream and turbine upstream but for any bypass path flow control devices (e.g., valves 232, 234), and without any engine or other components that modify or affect the gas (e.g., intercooler 214, heater 236) other than, again, bypass path flow control devices (e.g., valves 232, 234) and related plumbing; and (ii) there is no portion of the bypass path that is not a direct path.

In another embodiment, at least part of the bypass path 230 is an indirect path between downstream of the compressor 222 and upstream of the turbine 226, meaning there is at least one engine or other component that modifies or affects the gas (e.g., intercooler 214, heater 236), which is disposed somewhere along the bypass flow route (e.g., extending from the compressor output, through at least part of the bypass path, and to the turbine input), and which is in addition to any flow control devices (e.g., valves 232, 234) of the bypass path. In other words, in an indirect path, at least some of the gas that is routed through the bypass path is subjected to an engine or other component that modifies or affects the gas (the engine or other component being in addition to any flow control devices of the bypass path), somewhere between the compressor output and turbine input.

In another embodiment, the bypass path 230 is solely an indirect path between downstream of the compressor 222 and upstream of the turbine 226, meaning (i) there is at least one engine or other component that modifies or affects the gas (e.g., intercooler 214, heater 236), which is disposed somewhere along the bypass flow route (e.g., extending from the compressor output, through at least part of the bypass path, and to the turbine input), and which is in addition to any flow control devices (e.g., valves 232, 234) of the bypass path; and (ii) there is no portion of the bypass path that is a direct path.

In an embodiment, normal operational gas flow through the engine 106 is from the inlet 210, through the compressor 222, between the compressor and turbine 226 (e.g., through the engine cylinders for combustion, or otherwise), through the turbine, and out the exhaust system. Thus, "upstream" refers to a direction towards the inlet (against the direction of the normal operational gas flow), and "downstream" refers to a direction towards the exhaust (in the direction of the normal operational gas flow).

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc., are used to distinguish one element from another.

The invention claimed is:

1. A method of operating a marine vehicle comprising an engine including a turbocharger including a compressor and a turbine, comprising:
adjusting a bypass path positioned to direct boosted intake air from downstream of the compressor to upstream of the turbine according to whether a propeller coupled to the engine is engaged when an engine acceleration exceeds an acceleration threshold; and
adjusting the bypass path from downstream of the compressor to upstream of the turbine according to whether the propeller is engaged when an engine deceleration exceeds a deceleration threshold.

2. The method of claim 1, wherein the bypass path is adjusted according to an engine speed and a propeller load when the engine acceleration exceeds the acceleration threshold, where the propeller load is a function of a pitch of the propeller and a speed of the propeller.

3. The method of claim 2, wherein intake air flow through the bypass path is heated when the engine acceleration exceeds the acceleration threshold.

4. The method of claim 2,
wherein the bypass path is adjusted according to an intake manifold pressure, an engine speed, and a propeller load when the engine deceleration exceeds the deceleration threshold, according to a look-up table that maps the intake manifold pressure, engine speed, and propeller load to a degree of opening for the bypass path.

5. The method of claim 4, wherein the deceleration threshold and the acceleration threshold vary according to engine speed.

6. The method of claim 2, wherein, when the engine acceleration exceeds the acceleration threshold, the bypass path is adjusted when the propeller is engaged and not adjusted when the propeller is not engaged.

7. The method of claim 6, wherein, when the engine acceleration exceeds the acceleration threshold, the bypass path is adjusted by opening a valve in the bypass path, and wherein when the valve in the bypass path is open, gas routed through the bypass path is not present in a fuel/gas combustion event in the engine.

8. The method of claim 2, wherein adjusting the bypass path includes adjusting the bypass path from downstream of the compressor to upstream of the turbine according to a first look-up table when the propeller is engaged and adjusted according to a second, different look-up table when the propeller is not engaged.

9. The method of claim 2, wherein a degree of opening of the bypass path from downstream of the compressor to upstream of the turbine is adjusted according to pressure of an intake manifold of the engine, engine speed of the engine, and propeller load of the propeller.

10. The method of claim 4, wherein the bypass path is positioned to direct boosted intake air from downstream of the compressor directly to upstream of the turbine.

11. The method of claim 10, wherein the bypass path is positioned to direct boosted intake air from downstream of the compressor to upstream of the turbine without passing through an intervening heat exchanger and where gas routed through the bypass path is not present in a fuel/gas combustion event in the engine.

12. The method of claim 5, wherein adjusting the bypass path includes adjusting the bypass path from downstream of the compressor to upstream of the turbine according to a first look-up table when the propeller is engaged and adjusted according to a second, different look-up table when the propeller is not engaged.

13. The method of claim 5, wherein the degree of opening of the bypass path from downstream of the compressor to upstream of the turbine is adjusted according to the intake manifold pressure of the engine, engine speed of the engine, and propeller load of the propeller.

14. A marine vehicle system, comprising:
an engine including a bypass path and a turbocharger including a turbine and a compressor, the bypass path including a valve adjustable to selectively bypass gas around the engine by routing the gas from downstream of the compressor to upstream of the turbine;
a propeller;
a coupling device connected to the engine and configured to selectively engage and disengage with the propeller; and
a control system having a computer readable storage medium with code therein, the code including instructions for,
selectively engaging the propeller;
selectively disengaging the propeller;
adjusting the valve of the bypass path responsive to an engine acceleration exceeding an acceleration threshold and the propeller being engaged; and
adjusting the valve of the bypass path responsive to an engine deceleration exceeding a deceleration threshold, wherein the valve of the bypass path is adjusted differently when the propeller is engaged from when the propeller is disengaged.

15. The marine vehicle system of claim 14, wherein the valve of the bypass path is adjusted according to an engine speed responsive to the engine acceleration exceeding the acceleration threshold and the propeller being engaged.

16. The marine vehicle system of claim 14, wherein gas flow through the bypass path is heated when the engine acceleration exceeds the acceleration threshold and the propeller is engaged.

17. The marine vehicle system of claim 14, wherein the valve of the bypass path is adjusted according to an intake manifold pressure and an engine speed responsive to the engine deceleration exceeding the deceleration threshold.

18. The marine vehicle system of claim 14, wherein adjusting the valve of the bypass path responsive to the engine acceleration exceeding the acceleration threshold and the propeller being engaged comprises opening the valve of the bypass path, and wherein when the valve of the bypass path is open, gas routed through the bypass path is not present in a fuel/gas combustion event in the engine.

19. The marine vehicle system of claim 14, wherein the bypass path is a direct path between downstream of the compressor and upstream of the turbine that includes the valve and no other intervening components.

20. The marine vehicle system of claim 14, wherein when the valve of the bypass path is closed, gas flows into an intake system inlet, through the compressor, through cylinders of the engine for combustion, through the turbine, and out an exhaust system, and wherein when the valve of the bypass path is open, gas flows into the intake system inlet, through the compressor, around the engine, through the turbine, and out the exhaust system.

* * * * *